(12) United States Patent
Hirvi

(10) Patent No.: US 12,023,898 B2
(45) Date of Patent: Jul. 2, 2024

(54) COLLATION SHRINK FILM PRINTABLE WITH A DIGITAL PRINTING PROCESS

(71) Applicant: RKW SE, Frankenthal (DE)

(72) Inventor: Hannu Kalevi Hirvi, Pori (FI)

(73) Assignee: RKW SE, Frankenthal (DE)

( * ) Notice: Subject to any disclaimer, the term of this patent is extended or adjusted under 35 U.S.C. 154(b) by 1010 days.

(21) Appl. No.: 16/964,970

(22) PCT Filed: Jan. 21, 2019

(86) PCT No.: PCT/EP2019/051377
§ 371 (c)(1),
(2) Date: Jul. 24, 2020

(87) PCT Pub. No.: WO2019/145255
PCT Pub. Date: Aug. 1, 2019

(65) Prior Publication Data
US 2021/0046743 A1 Feb. 18, 2021

(30) Foreign Application Priority Data
Jan. 26, 2018 (EP) .................................... 18153696

(51) Int. Cl.
| | | |
|---|---|---|
| *B32B 27/08* | (2006.01) | |
| *B32B 27/18* | (2006.01) | |
| *B32B 27/30* | (2006.01) | |
| *B32B 27/32* | (2006.01) | |
| *B41M 5/52* | (2006.01) | |
| *B65B 11/00* | (2006.01) | |
| *B65B 21/24* | (2006.01) | |
| *B65B 53/02* | (2006.01) | |
| *B65D 71/08* | (2006.01) | |

(52) U.S. Cl.
CPC .............. *B32B 27/08* (2013.01); *B32B 27/18* (2013.01); *B32B 27/306* (2013.01); *B32B 27/308* (2013.01); *B32B 27/32* (2013.01); *B41M 5/5218* (2013.01); *B65B 11/004* (2013.01); *B65B 21/245* (2013.01); *B65B 53/02* (2013.01); *B65D 71/08* (2013.01); *B32B 2250/246* (2013.01); *B32B 2264/1021* (2020.08); *B32B 2270/00* (2013.01); *B32B 2307/406* (2013.01); *B32B 2307/41* (2013.01); *B32B 2307/5825* (2013.01); *B32B 2307/736* (2013.01); *B32B 2307/75* (2013.01); *B32B 2439/70* (2013.01); *B65B 2220/24* (2013.01)

(58) Field of Classification Search
None
See application file for complete search history.

(56) References Cited

U.S. PATENT DOCUMENTS

| | | |
|---|---|---|
| 2005/0064161 A1 | 3/2005 | Ravel et al. |
| 2005/0166551 A1 | 8/2005 | Keane et al. |
| 2016/0282765 A1 | 9/2016 | Sharmi et al. |
| 2019/0135959 A1* | 5/2019 | Kazemi ............... C08F 210/16 |

FOREIGN PATENT DOCUMENTS

| | | |
|---|---|---|
| EP | 1 941 998 A1 | 7/2008 |
| EP | 2 875 948 A1 | 5/2015 |
| WO | WO 2012/164308 A1 | 12/2012 |
| WO | WO 2013/081742 A1 | 6/2013 |
| WO | WO 2017/055174 A1 | 4/2017 |

OTHER PUBLICATIONS

Jiri George Drobny, "Slip Agents, Processing Aids", Handbook of Thermoplastic Elastomers (First edition 2007), Excerpts from Handbook of Thermoplastic Elastomers, Second edition (2014), 4 pgs.
International Search Report, PCT/EP2019/051377, Apr. 15, 2019, 2 pgs.

* cited by examiner

*Primary Examiner* — Ramsey Zacharia
(74) *Attorney, Agent, or Firm* — Paul D. Strain, Esq.; Strain & Strain PLLC

(57) ABSTRACT

Multi-layer collation shrink film comprising a main layer based on a polyethylene mixture comprising 75 to 85 wt.-% low density polyethylene and 15 to 25 wt.-% high density polyethylene or linear low density polyethylene and a skin layer based on a polar ethylene copolymer with vinyl acetate or alkyl (meth)acrylate with a vinyl acetate or alkyl (meth) acrylate content of at least 15 wt.-% and containing 5000 to 20000 ppm silica and a slip agent, use of the film in multi-layer packaging films and method for packaging objects together with the multi-layer collation shrink film including printing the skin layer with a digital ink printing process before or after packaging the objects.

27 Claims, No Drawings

COLLATION SHRINK FILM PRINTABLE WITH A DIGITAL PRINTING PROCESS

CROSS-REFERENCE TO RELATED PATENT APPLICATIONS

This application is a National Stage of International Application No. PCT/EP2019/051377, filed Jan. 21, 2019, which is based upon and claims the benefit of priority from prior European Patent Application No. 18153696.2, filed Jan. 26, 2018, the entire contents of all of which are incorporated herein by reference in their entirety.

The present invention relates to packaging film, more specifically a collation shrink film, that is printable with a digital ink printing process, to a use of the film for packaging drink or food containers and to a method for packaging objects together including printing the skin layer of the packaging film with a digital ink printing process.

The term collation shrink denotes packaging that bundles together two or more objects by wrapping them with film and then shrinking the film by heat to provide a tight fit around the objects. Such films have to show adequate shrink, should be tear resistant to obtain a durable package that can be handled without damage and also have to be transparent to allow viewing the objects through the packaging. The most common use is for making bundles from 4, 6, 12 or 24 beverage bottles or cans. Naturally, the number of objects can vary in wide ranges, typically 2 to 30, more common 4 to 24, objects are packed and also any number inside these ranges including uneven numbers is possible, e.g. 3, 5, 8, 9, 10, 15, 20 objects in one package.

Collation shrink films and also other packaging films need to be sealable to themselves during the packaging process. Further, packaging is typically printed. Known collation shrink films made with (sealable) outer layers from polyethylene can be printed with flexo gravure printing processes using solvent based inks. However, flexo printing processes are not suited to changes in print on short notice or for printing small numbers of prints up to individual prints.

Digital ink printing processes could solve these problems, for example the HP Indigo 20000 Digital press allows individual prints based on digital data. However, ink adhesion on standard collation shrink films with an outer layer based on polyethylene is insufficient, even with usual measures such as corona treatment. While it is possible to apply a primer layer as suggested by the manufacturer of the press, see http://www.hp.com/hpinfo/newsroom/press_kits/2012/HPdrupa12/HP_Indigo_20000.pdf, which provides good ink adhesion, this impairs sealability. Further, a primer layer had a negative impact on shrink properties in some cases.

Since requirements on collation shrink films are diverse and not at all easy to fulfil in combination, it is not readily apparent how to modify existing films to provide printability while maintaining the required properties like shrink, tear resistance and transparency. Thus, the object of providing printable collation shrink films remains to be solved.

US 2016/282765 A1 relates to improving the ink-jet printability of packaging materials by providing an ink receiving layer containing a material selected from ethylene vinyl acetate (EVA), ethylene acrylic acid (EAA), ethylene-methyl methacrylic acid (EMMA), ethylene α-olefin polymer and mixtures thereof. The film is described as suitable for any type of packaging, but no specific formulation for specific packaging applications are provided.

Surprisingly it has now been found that multi-layer films having a skin layer based on ethylene copolymers with vinyl acetate or alkyl(meth)acrylate with a vinyl acetate or alkyl (meth)acrylate content of at least 15% and comprising 5000 to 20000 ppm silica shows good printability without adverse effects on shrink, transparency, tear resistance, and sealability.

The mentioned object is therefore solved by multi-layer collation shrink films comprising a main layer based on a polyethylene mixture comprising 75 to 85 wt.-% low density polyethylene and 15 to 25 wt.-% high density polyethylene or linear low density polyethylene and a skin layer based on an ethylene copolymer with vinyl acetate (EVA) or alkyl (meth)acrylate with a vinyl acetate or alkyl(meth)acrylate content of at least 15 wt.-% and containing 5000 to 20000 ppm silica and a slip agent. The object is further solved by using a film comprising a main layer based on a polyethylene mixture comprising 75 to 85 wt.-% low density polyethylene and 15 to 25 wt.-% high density polyethylene or linear low density polyethylene and skin layer based on ethylene copolymer with vinyl acetate or alkyl(meth)acrylate with a vinyl acetate or alkyl(meth)acrylate content of at least 15 wt.-% and containing 5000 to 20000 ppm silica and a slip agent as collation shrink film for bundling beverage or food containers. The film is also useful as other packaging film. The problem is also solved by a method for packaging objects together including printing the skin layer of the packaging film with a digital ink printing process.

Collation shrink films are known as such, see e.g. WO 2013/081742 A1, EP 1 941 998 A1, US 2005/0064161 A1, EP 2 875 948 A1, WO 2012/164308 A1. WO 2017/055174 describes collation shrink films AB or ABA that can have a layer A from EVA with a VA content from 5 to 40 wt.-%. The second layer B shall be from PE with a density from 900 to 960 kg/m$^3$, except ethylene plastomers. EP 2 875 948 is proposing an ethylene acrylate layer C for making thick structures ABCCBA. Further, WO 2015/179291 teaches ionomers, i.e. copolymers of ethylene with (meth)acrylic acid having 1 to 99% of the acid groups neutralized to carboxylate salts, as layer of collation shrink films. The (meth)acrylic acid content in the copolymer is 2 to 30 wt.-%. Using additives, preferably slip or antiblock additives (silica and talc mentioned), is described to enhance behaviour of the film in the package production steps. None of these documents gives any hint that adding silica to ethylene copolymers with a polar comonomer and with a high amount of the comonomer could provide digitally printable films with otherwise not decreased properties.

According to the invention, the multi-layer film has a skin layer based on a polar ethylene copolymer with vinyl acetate or alkyl(meth)acrylate and containing 5000 to 20000 ppm silica, preferably 5000 to 15000 ppm silica, most preferred 7000 to 11000 ppm silica. Without the addition of silica the film tends to curl during printing and especially during the shrink packaging process. The skin layer is sealable to itself and also to polyethylene layers such as low density polyethylene (LDPE) layers.

Furthermore, the skin layer contains a slip agent to adjust (decrease) friction and ensure fast and smooth processing during collation shrink and handling of the packages. Suitable slip agents are fatty acid amides, preferably unsaturated fatty acid primary amides. Fatty acid is defined herein as covering straight chain carboxylic acids with 13 to 28 carbon atoms, preferably 18 to 22 carbon atoms. Amide means a group —NH—C(=O)—, where the NH is NH$_2$ when forming the end of the molecule (primary amide) or —NH is connected to another alkyl, optionally substituted, e.g. with an —OH at the end. Especially preferred are oleamide and erucamide, erucamide being most preferred. Typically, slip agents are used in amounts of 0.2 to 2 wt.-%, but according to the invention the amount ranges from 0.02 to 0.15 wt.-%, preferably from 0.05 to 0.1 wt.-% and most preferred about 0.075 wt.-%, to maintain printability. The combination with silica allows a low enough coefficient of friction with such low amounts. The slip agent is usually added as masterbatch.

An important point is the amount of polar comonomer in the ethylene copolymer. For good ink adhesion a comparably high amount is required, which would not be used otherwise. A high comonomer amount results in a tacky film surface. High comonomer contents also increase the probability of curly films. But with small amounts like e.g. 10 wt.-% vinyl acetate or alkyl(meth)acrylate ink adhesion is not sufficient. Thus, the amount of vinyl acetate or alkyl (meth)acrylate is at least 15 wt.-%, preferably at least 16 wt.-%. The upper limit results from tackiness of the film layer, usually there should be not more than 28 wt.-%, preferably not more than 20 wt.-%.

The term alkyl(meth)acrylate denotes alkyl acrylates, alkyl methacrylates and their mixture. The alkyl typically has from 1 to 6 carbon atoms, preferably from 1 to 4 carbon atoms. The preferred alkyls are methyl, ethyl, iso-butyl, and n-butyl. The most preferred alkyl(meth)acrylates are ethyl methacrylate (EMA) and butyl acrylate (EBA). Useful alkyl (meth)acrylates can be obtained from DuPont.

The most preferred skin layer according to the invention is based on EVA. Useful EVA is commercially available as Escorene Ultra from ExxonMobil, USA, Greenflex FD 50 from versalis S.p.A., Italy, Evatane from Arkema, France, and others.

The use of silica as antiblock agent is known. According to the invention, the materials known as such are useful. Typically, silica is added in the form of a masterbatch, i.e. diluted in a polymer. While it is preferred to use a masterbatch from the same polymer the layer is based on, this is not always possible. Useful silica masterbatches are e.g. Polybatch® F 15 from A. Schulman Inc, USA, Preadd AB 171 from Premix, Finland.

Herein, the term "based on" means that the mentioned polymer is the major polymeric component in the layer. Thus, in a layer based on a polymer (or polymer mixture) that polymer (or polymer mixture) forms at least 70 wt.-% of all polymers present, preferably at least 80 wt.-%, most preferred at least 90 wt.-%. The term includes situations where—apart from trace amounts due to impurities—no other polymers are present. Besides the polymeric component(s) a layer can and often will contain one or more of usual processings aids, stabilizers against heat or light, if desired colorants, which are known as such as additives for the polymer and/or application, and which are used in their usual amounts. It is to be noted that additives are often added as masterbatch, i.e. mixed into a polymer, and while using the same polymer for the masterbatch is preferred, it is not always possible. Thereby, other polymers may be introduced into layers in minor amounts. If other polymers are present in the skin layer, the amount of polar comonomer should be kept above the minimum amount stated of 15 wt.-%. It is contemplated that a higher amount of comonomer in the polar ethylene copolymer can compensate for a content of polyethylene like LDPE or LLDPE in the skin layer.

The main layer of the film according to the invention is based on a polyethylene polymer mixture providing shrink force. The mixture preferably comprises high density polyethylene (HDPE) and low density polyethylene (LDPE) or linear low density polyethylene (LLDPE) and LDPE. Such mixtures are common for shrink films, since they provide high shrink forces. Suitable are mixtures of 15 to 25 wt.-% HDPE or LLDPE and 75 to 85 wt.-% LDPE. Useful LDPE, HDPE and LLDPE are commercially available, e.g. from Borealis, DOW, ExxonMobil, Sabic and others.

In a preferred embodiment, the film according to the invention contains a third inner layer, preferably based on LDPE. The same materials as mentioned before for the main layer are useful.

The film typically has a thickness from 20 to 150 µm, preferably from 30 to 70 µm. Usually, the main layer makes up 40 to 80% of the total thickness, preferably 50 to 75%, most preferred 60 to 70%, and the skin layer the rest or the skin layer and the inner layer share the rest. Thus, suitable thicknesses of the main layer range from 8 to 120 µm, preferably from 18 to 49 µm. Useful thicknesses of the skin layer and the inner layer are 2 to 45 µm, preferably 5 to 19 µm.

As is known per se, the films are made by coextrusion or, less preferred, lamination of the layers. One advantageous method is blown film coextrusion, since the blow-up ratio allows to introduce shrinkability in transverse direction (TD). A separate stretching is not needed and preferably not applied.

The shrinkage-% TD should be 10-25% at a temperature of 150° C., determined according ASTM D 2732. A films according to the invention consisting of a skin layer based on EVA with 17% VA, a main layer based on LDPE+HDPE (e.g about 20 wt.-% HDPE) and an inner layer based on LDPE shows a very advantageous shrink behaviour. The EVA shrinking temperature is 80 to 140° C., so the film starts shrinking a low temperature. The inner layer has a shrinking temperature from 110 to 180° C. and is able to continue the shrinking process. The main layer based on the polyethylene mixture has a shrinking temperature form 140 to 200° C. and provides a final shrink force. Therefore, such a preferred film has a very wide shrinking temperature window compared to standard films from LDPE and HDPE.

Useful collation shrink film should have a tear resistance in machine direction (MD) of at least 35 N/mm, determined according to ASTM D1922.

The most important optical property is gloss measured according to ASTM D2457 which should be at least 100 GU (60 deg.). Also, haze measured according to ASTM D1003 should preferably be below 10%. In case matt film is desired the gloss value should be below 30 GU.

The films have to be weldable by heat and/or ultrasonic welding. Layers from polar ethylene copolymers like EVA and EMA, EBA show good weldability to main layers or inner layers from polyethylene and polyethylene mixtures.

Collation shrink films according to the invention combine these properties with a good printability with digital printing systems like the HP Indigo 20000. Using a skin layer based on an ethylene copolymer like EVA or EMA or EBA and containing silica according to the invention allows to provide collation shrink films and other packaging like FFS films for making packages with excellent printability in digital printing processes. Printability can be enhanced by corona treatment as is known per se in the art. But contrary to what was believed so far, the skin layer used according to the invention does not need any coating with primers.

The invention will be illustrated further with reference to the examples that follow, without restricting the scope to the specific embodiments described. The invention includes all combinations of described and especially of preferred features that do not exclude each other.

If not otherwise specified any amount in % or parts is by weight and in the case of doubt referring to the total weight of the composition/mixture concerned. A characterization as "approximately", "around", "about" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

EXAMPLES

The materials listed in the following table 1 have been used.

TABLE 1

| material | description |
|---|---|
| HDPE1 | density 937 kg/m³, MI 0.55 (190° C./2.16 kg) |
| HDPE2 | density 961 kg/m³, MI 0.7 (190° C./2.16 kg) |
| LDPE1 | density 926 kg/m³, MI 0.3 (190° C./2.16 kg) |
| LDPE2 | density 918 kg/m³, MI 1.0 (190° C./2.16 kg) |
| LDPE3 | density 933 kg/m³, MI 2.2 (190° C./2.16 kg) |
| EVA | 17% vinyl acetate density 941 kg/m³, MI 0.4 (190° C./2.16 kg) |
| EBA | 17% butyl acrylate density 924 kg/m³, MI 7.0 (190° C./2.16 kg) |
| EMA | 11.5% ethyl methacrylate density 930 kg/m³, MI 1.5 (190° C./2.16 kg) |
| silica | silica masterbatch with 15% silica in LDPE |
| additive1 | slip masterbatch with 5% erucamide in LDPE |
| additive2 | Antistatic additive |
| additive3 | processing aid masterbatch with 15% fluorochemical in LDPE |

Several films were made with the layers listed in table 2. The components for the layers were fed into extruders and films made on a blown film coextrusion line with the following settings: temperature 180-210° C., output ~200 kg/h, blow-up-ratio 3.4. The layer thicknesses were in each film 42 μm for the main layer and 9 μm each for the skin layer and inner layer. The skin layer surface was treated with a corona discharge 40-46 DYN prior to printing.

TABLE 2

| sample | skin layer | main layer | inner layer |
|---|---|---|---|
| Inv 1 | 92.5% EVA<br>1.5% additive1<br>6% silica (9000 ppm) | 78% LDPE1<br>20% HDPE1<br>2% additive2 | 55.5% LDPE3<br>40% LDPE2<br>1.5% additive1<br>1% additive3<br>2% silica |
| Comp 1 | 65% EVA<br>31.5% LDPE3<br>1.5% additive 1<br>2% silica | 78% LDPE1<br>20% HDPE1<br>2% additive2 | 55.5% LDPE3<br>40% LDPE2<br>1.5% additive1<br>1% additive3<br>2% silica |
| Comp 2 | 65% EBA<br>31.5% LDPE3<br>1.5% additive1<br>2% silica | 78% LDPE1<br>20% HDPE2<br>2% additive2 | 40% LDPE2<br>55.5% LDPE3<br>1.5% additive1<br>1% additive3<br>2% silica |
| Comp 3 | 96.5% EMA<br>1.5% additive<br>2% silica | 20.0% HDPE1<br>78.0% LDPE1<br>2.0% additive2 | 40% LDPE2<br>55.5% LDPE3<br>1.5% additive1<br>1% additive3<br>2% silica |
| Comp 4 | 55.8% LDPE3<br>40% LDPE2 | 78.5% LDPE1<br>20% HDPE2 | 55.8% LDPE3<br>40% LDPE2 |

TABLE 2-continued

| sample | skin layer | main layer | inner layer |
|---|---|---|---|
| | 0.7% additive1<br>2.5% silica | 1.5% additive2 | 1.5% additive1<br>1% additive3<br>2.5% silica |

The films obtained were tested for ink adhesion (by applying a self-adhesive tape and stripping it off), shrink in transverse direction by ASTM D 2732 at 150° C. and tear resistance according to ASTM D1922. The results are reported in table 3.

TABLE 3

| sample | Ink Adhesion | shrink TD | tear resistance MD | observations |
|---|---|---|---|---|
| Inv 1 | Good | 22% | >35 N/mm | No curling |
| Comp 1 | Limit case | 18% | >35 N/mm | Some curling |
| Comp 2 | Limit case | 16% | >35 N/mm | Curling |
| Comp 3 | Limit case | 16% | >35 N/mm | Some curling |
| Comp 4 | No adhesion | 15% | >35 N/mm | No curling |

As can be seen, standard collation shrink film Comp 4 from poly-ethylenes could not be printed in the HP Indigo 20000, the ink was completely stripped off from the surface when a self-adhesive tape was applied onto it and removed again. In contrast, using a skin layer from EVA with 17% vinyl acetate and containing 9000 ppm silica (Inv 1) provided good printability. Furthermore, the film showed appropriate shrink and no curling.

The comparison films with a skin layer from a blend of EVA having 17% vinyl acetate with LDPE or a blend of EBA with 17% butyl acrylate with LDPE or from EMA with 11.5% ethyl methacrylate could not be run in a packing line. With a too small amount of silica the films curled after cutting before the wrapping process. The small amount of polar comonomer in the polymer material of the skin layer also resulted in a less than optimal ink adhesion.

The invention claimed is:

1. A multi-layer collation shrink film comprising:
a main layer based on a polyethylene mixture comprising 75 to 85 wt.-% low density polyethylene and 15 to 25 wt.-% high density polyethylene or linear low density polyethylene and
a skin layer based on a polar ethylene copolymer with vinyl acetate or alkyl (meth)acrylate with a vinyl acetate or alkyl (meth)acrylate content of at least 15 wt.-% and containing 5000 to 20000 ppm silica and a slip agent, wherein the slip agent is configured to decrease friction between the collation shrink film and equipment for handling an object wrapped by the collation shrink film wherein an amount of slip agent ranges from 0.01 to 0.1 wt %.

2. The multi-layer collation shrink film according to claim 1, wherein the content of silica ranges from 5000 to 15000 ppm.

3. The multi-layer collation shrink film according to claim 1, wherein the content of vinyl acetate or alkyl (meth)acrylate in the ethylene copolymer ranges from 15 to 28 wt.-% of the total ethylene copolymer weight.

4. The multi-layer collation shrink film according to claim 3, wherein the content of silica ranges from 7000 to 11000 ppm and an amount of slip agent ranges from 0.05 to 0.1 wt.-%.

5. The multi-layer collation shrink film according to claim 1, wherein the polar ethylene copolymer is a copolymer with alkyl (meth)acrylate and the alkyl (meth)acrylate is a $C_1$-$C_4$-alkyl (meth)acrylate.

6. The multi-layer collation shrink film according to claim 5, wherein a content of vinyl acetate or alkyl(meth)acrylate ranges from 16 to 20 wt.-%.

7. The multi-layer collation shrink film according to claim 1, wherein the ethylene copolymer is ethylene vinyl acetate.

8. The multi-layer collation shrink film according to claim 1, wherein the skin layer comprises a slip agent selected from unsaturated fatty acid primary amides.

9. The multi-layer collation shrink film according to claim 1, wherein the film contains an inner layer.

10. The multi-layer collation shrink film according to claim 9, wherein the inner layer is based on low density polyethylene.

11. The multi-layer collation shrink film according to claim 1, wherein the thickness of the film ranges from 20 to 150 μm.

12. The multi-layer collation shrink film according to claim 1, wherein the main layer makes up 40 to 80% of the film thickness.

13. The multi-layer collation shrink film according to claim 1, wherein the film has at least one of:
   a shrinkage in transverse direction according to ASTM D 2732 at 150° C. of 10 to 25%
   a tear resistance according to ASTM D1922 of at least 35 N/mm
   a gloss according to ASTM D2457 of at least 100 (60 deg.) or below 30
   a haze according to ASTM D1003 below 10.

14. The multi-layer collation shrink film according to claim 13, wherein thickness of the film ranges from 30 to 70 μm.

15. The multi-layer collation shrink film according to claim 13, wherein the main layer makes up 50 to 75% of the film thickness.

16. The multi-layer collation shrink film according to claim 1, wherein the slip agent is oleamide or erucamide.

17. The multi-layer collation shrink film according to claim 1, wherein an amount of slip agent ranges from 0.05 to 0.1 wt.-%.

18. A method for packaging objects together with a multi-layer collation shrink film according to claim 1, comprising the steps:
   arranging the objects adjacent to each other to form a bundle,
   wrapping the multi-layer collation shrink film of claim 1 around the bundle,
   sealing the edges of the film together,
   exposing the bundle to a temperature sufficient to shrink the multi-layer collation shrink film to form a package, and
   cooling the package,
   wherein the multi-layer collation shrink film is printed with a digital ink printing process onto its skin layer before wrapping around the bundle and/or after cooling of the package,
   wherein the slip agent decreases friction during packaging and handling of the package.

19. The method according to claim 18, wherein from 2 to 30 objects are packed.

20. The method according to claim 19, wherein 4, 6, 8, 9, 10, 12, 15, 20, or 24 objects are packed.

21. The method according to claim 19, wherein beverage bottles or cans are packed.

22. The method according to claim 21, wherein the content of silica ranges from 7000 to 11000 ppm, the content of vinyl acetate or alkyl(meth)acrylate ranges from 16 to 20 wt.-%, and an amount of slip agent ranges from 0.05 to 0.1 wt.-%.

23. The method according to claim 18, wherein beverage or food containers are packed.

24. The method according to claim 18, wherein the alkyl(meth)acrylate is ethyl methacrylate or butyl acrylate.

25. The method according to claim 18, wherein the content of silica ranges from 7000 to 11000 ppm, the content of vinyl acetate or alkyl(meth)acrylate ranges from 16 to 20 wt.-%, and an amount of slip agent ranges from 0.05 to 0.1 wt.-%.

26. The method according to claim 18, wherein the slip agent is oleamide or erucamide.

27. The method according to claim 18, wherein the account of slip agent ranges from 0.05 to 0.1 wt. %.

* * * * *